United States Patent
Kufer

(10) Patent No.: US 9,718,426 B2
(45) Date of Patent: Aug. 1, 2017

(54) SAFETY SYSTEM FOR A MOTOR VEHICLE, ASSOCIATED MOTOR VEHICLE, AND METHOD FOR CONTROLLING A SAFETY SYSTEM FOR A MOTOR VEHICLE

(71) Applicant: AUDI AG, Ingolstadt (DE)

(72) Inventor: Stefan Kufer, Eitensheim (DE)

(73) Assignee: AUDI AG, Ingolstadt (DE)

( * ) Notice: Subject to any disclaimer, the term of this patent is extended or adjusted under 35 U.S.C. 154(b) by 119 days.

(21) Appl. No.: 14/897,547

(22) PCT Filed: Jun. 3, 2014

(86) PCT No.: PCT/EP2014/001493
§ 371 (c)(1),
(2) Date: Dec. 10, 2015

(87) PCT Pub. No.: WO2014/198389
PCT Pub. Date: Dec. 18, 2014

(65) Prior Publication Data
US 2016/0121834 A1    May 5, 2016

(30) Foreign Application Priority Data
Jun. 11, 2013  (DE) ................ 10 2013 009 717

(51) Int. Cl.
*G06F 19/00*    (2011.01)
*B60R 21/0134*  (2006.01)
*B60R 21/01*    (2006.01)

(52) U.S. Cl.
CPC  *B60R 21/0134* (2013.01); *B60R 2021/01034* (2013.01); *B60R 2021/01211* (2013.01); *B60R 2021/01272* (2013.01)

(58) Field of Classification Search
USPC .......................................... 701/45
See application file for complete search history.

(56) References Cited

U.S. PATENT DOCUMENTS 5,810,417 A * 9/1998 Jesadanont ........ B60N 2/4221
                                                  296/68.1
6,082,764 A    7/2000 Seki et al.
(Continued)

FOREIGN PATENT DOCUMENTS

CN    102083653    6/2011
CN    102985294    3/2013
(Continued)

OTHER PUBLICATIONS

International Search Report issued by the European Patent Office in International Application PCT/EP2014/001493.

*Primary Examiner* — Ronnie Mancho
(74) *Attorney, Agent, or Firm* — Henry M. Feiereisen LLC

(57) ABSTRACT

The invention relates to a safety system for a motor vehicle (1), comprising a sensor (2) for predicting an imminent collision, which sensor is coupled to an evaluating unit (3), a control device (10) for triggering a first device (7, 9) at a defined first time before the predicted collision, which first device causes a rearward displacement of at least one vehicle occupant (4), wherein the control device (10) is designed to trigger a second device (8) at a defined second time before the predicted collision which follows the first time, which second device applies a counter force to the at least one vehicle occupant (4).

20 Claims, 2 Drawing Sheets

(56) References Cited

U.S. PATENT DOCUMENTS

| | | | | |
|---|---|---|---|---|
| 6,227,563 | B1* | 5/2001 | Talisman | B60N 2/002 280/735 |
| 6,312,050 | B1* | 11/2001 | Eklind | B60N 2/4221 297/216.15 |
| 6,463,372 | B1* | 10/2002 | Yokota | B60N 2/2821 280/801.1 |
| 6,758,495 | B2* | 7/2004 | Brambilla | B60R 21/0132 180/268 |
| 7,103,460 | B1* | 9/2006 | Breed | B60C 23/0408 701/29.1 |
| 2002/0014760 | A1* | 2/2002 | Bossecker | B60R 21/207 280/730.1 |
| 2002/0036398 | A1* | 3/2002 | Wohllebe | B60R 21/207 280/735 |
| 2004/0251367 | A1 | 12/2004 | Suzuki et al. | |
| 2006/0042851 | A1* | 3/2006 | Herrmann | B60N 2/002 180/271 |
| 2006/0186713 | A1* | 8/2006 | Breed | B60N 2/0232 297/216.12 |
| 2007/0228703 | A1* | 10/2007 | Breed | B60N 2/0232 280/735 |
| 2007/0235297 | A1* | 10/2007 | Stoschek | B60N 2/0228 200/5 R |
| 2008/0125940 | A1* | 5/2008 | Breed | B60R 21/013 701/45 |
| 2011/0074190 | A1 | 3/2011 | Hashimoto | |
| 2011/0077826 | A1* | 3/2011 | Baumann | B60N 2/42745 701/45 |
| 2011/0227378 | A1* | 9/2011 | Swierczewski | B60N 2/06 297/216.15 |
| 2012/0169033 | A1* | 7/2012 | Heasman | B60R 22/4676 280/733 |
| 2012/0265407 | A1* | 10/2012 | Zimmermann | B60N 2/4221 701/45 |
| 2016/0121834 | A1 | 5/2016 | Kufer | |

FOREIGN PATENT DOCUMENTS

| | | |
|---|---|---|
| DE | 102 12 963 A1 | 10/2003 |
| DE | 103 31 212 A1 | 2/2005 |
| DE | 10 2007 015 768 A1 | 10/2007 |
| DE | 10 2010 053 063 A1 | 6/2012 |
| DE | 10 2012 003 898 A1 | 10/2012 |
| DE | 10 2011 108 915 A1 | 1/2013 |
| DE | 10 2011 108 918 A1 | 1/2013 |
| DE | 10 2011 122 203 A1 | 6/2013 |
| EP | 1 527 959 A1 | 5/2005 |
| EP | 1 591 308 A1 | 11/2005 |
| EP | 1 591 309 A1 | 11/2005 |
| EP | 1 839 960 A2 | 10/2007 |

* cited by examiner

SAFETY SYSTEM FOR A MOTOR VEHICLE, ASSOCIATED MOTOR VEHICLE, AND METHOD FOR CONTROLLING A SAFETY SYSTEM FOR A MOTOR VEHICLE

CROSS-REFERENCES TO RELATED APPLICATIONS

This application is the U.S. National Stage of International Application No. PCT/EP2014/001493, filed Jun. 3, 2014, which designated the United States and has been published as International Publication No. WO 2014/198389 and which claims the priority of German Patent Application, Serial No. 10 2013 009 717.7, filed Jun. 11, 2013, pursuant to 35 U.S.C. 119(a)-(d).

BACKGROUND OF THE INVENTION

The invention relates to a safety system for a motor vehicle, including a sensor, coupled to an evaluation unit, for predicting an impending collision, a control device for triggering a first device to cause a rearward displacement of at least one vehicle occupant at a predetermined first time instance prior to the predicted collision.

Safety systems in motor vehicles are primarily provided to protect vehicle occupants from injuries or reduce such injuries in the event of an impact. Examples of such safety systems are airbags, shiftable steering systems, or belt tensioners. Originally, activation of such safety systems took place in terms of time only after an impact. In the meantime, safety systems have been proposed which enable activation already before a collision.

DE 10 2011 108 915 A1 describes a restraining device for a motor vehicle, using a sensor to determine an impending impact. When recognizing an impending collision, the vehicle occupants are shifted backwards to thereby attempt a reduction of a speed differential between the vehicle occupants and the vehicle at the time of the impact. In this way, stress on the vehicle occupants shall be minimized. The rearward displacement can be realized by a controlled movement of the vehicle seat. In this safety system, the phase to couple the vehicle occupants to the deceleration of the vehicle occurs only after the impact has begun. At the beginning of the collision, there exists a certain elasticity. However, efforts are underway to realize a best possible coupling of the vehicle occupants to the vehicle so as to minimize forces and accelerations acting on the vehicle occupants. The degree of coupling between a vehicle occupant and the vehicle is indicated by the ride-down effect or respective RDE value which may range between 0% and 100%. A high RDE value is beneficial and means that a vehicle occupant is decelerated already when the collision begins.

SUMMARY OF THE INVENTION

The invention is thus based on the object to provide a safety system for a motor vehicle to improve the coupling of a vehicle occupant to the vehicle during the collision.

This object is attained by a safety system of the type mentioned above in which the control device is configured to trigger at a predetermined second time instance that follows the first time instance prior to the predicted collision a second device by which a counterforce is applied upon the at least one occupant.

The safety system according to the invention is based on two actions that are triggered successively in time. After predicting an impending collision, a rearward displacement of at least one vehicle occupant is firstly initiated. For this purpose, a first device is triggered to effect this rearward displacement of the vehicle occupant. It is hereby important to trigger this before the predicted impending collision. As a result of this rearward displacement, the vehicle occupant is shifted or displaced in opposition to the travel direction so that, on one hand, the absolute speed of the vehicle occupant is reduced at the time of the impact and, on the other hand, the relative speed is reduced between the vehicle occupant and the vehicle that has been decelerated as of the time of the impact.

Provision may be made in the safety system according to the invention to configure the first and/or the second device such that the counterforce is maintained up to the collision. The advantageous effect of the safety system according to the invention is realized, when the counterforce is maintained at least up to the beginning of the collision, optionally also beyond that.

Provision may be made in the safety system according to the invention to configure the first device as belt tensioner or airbag. In this way, the desired rearward displacement of the vehicle occupant is implemented by the belt tensioner and/or airbag.

Preferably, the belt tensioner of the safety system according to the invention can be locked as the counterforce is generated, so that the counterforce is maintained.

Likewise, provision may be made in the safety system according to the invention to configure the airbag during generation of the counterforce to have no or no open discharge opening. Accordingly, the airbag lying closely on the vehicle occupant generates and maintains the counterforce.

Preferably, the safety system according to the invention has the second device configured as seat or seat backrest. As the second device is triggered, i.e. by actuating the seat or the seat backrest, the required counterforce is generated.

With respect to the timing sequence, provision may be made in the safety system according to the invention that the first time instance is 300 ms to 5 ms before the predicted collision. At this time instance, the first device is triggered. Preferably, the first time instance may be approximately 100 ms prior to the predicted collision.

In addition, the invention relates to a motor vehicle having a safety system of the described type.

Furthermore, the invention relates to a method of controlling a safety system for a vehicle in which an impending collision can be predicted by a sensor that is coupled to an evaluation unit, and a first device, causing a rearward displacement of at least one vehicle occupant, is triggered by a control device at a predetermined first time instance prior to the predicted collision.

Provision is made in the method according to the invention to have the control device trigger a second device to apply a counterforce upon at least one occupant at a predetermined second time instance which follows the first time instance prior to the predicted collision.

Further configurations of the invention are described in the sub-claims.

BRIEF DESCRIPTION OF THE DRAWING

Further advantages and details of the invention will now be described on the basis of an exemplified embodiment with reference to the drawings. The drawings are schematic illustrations and show.

DETAILED DESCRIPTION OF THE PREFERRED EMBODIMENTS

Figure 1:
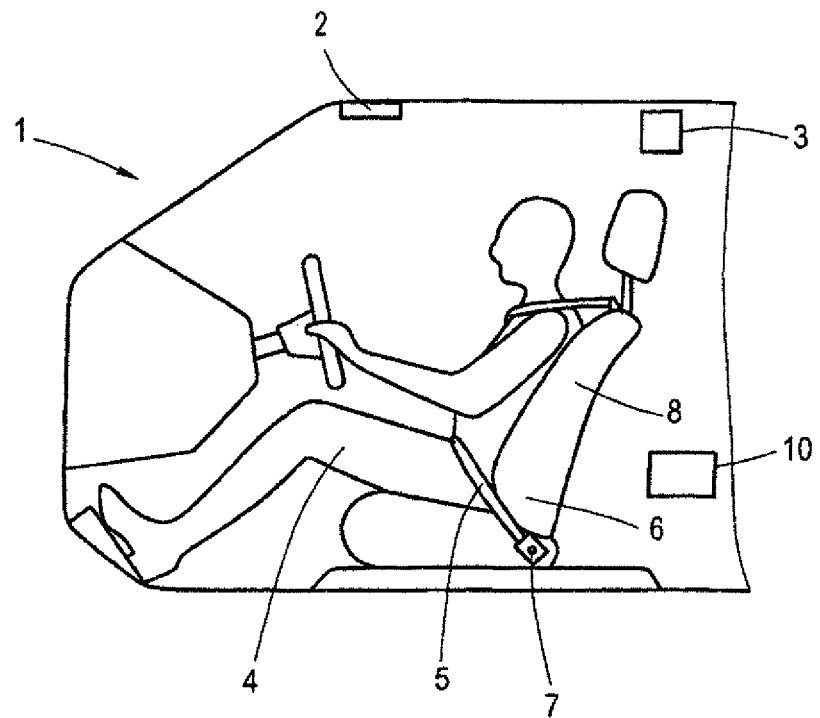
FIG. 1 the essential components of a safety system according to the invention.

FIG. 1 shows the essential components of a safety system for a partially illustrated motor vehicle 1, including a sensor 2 configured as a camera and producing image data which are processed in an evaluation unit 3. The evaluation of the image data in the evaluation unit 3 enables prediction of an impending collision with another vehicle. This prediction involves determination that occurrence of a collusion is unavoidable, because, for example, the distance between the two approaching vehicles is inadequate to effect a standstill through braking before a collision. As is apparent from FIG. 1, a vehicle occupant 4 is restrained by, a safety belt 5 against a vehicle seat 6.

Figure 4:
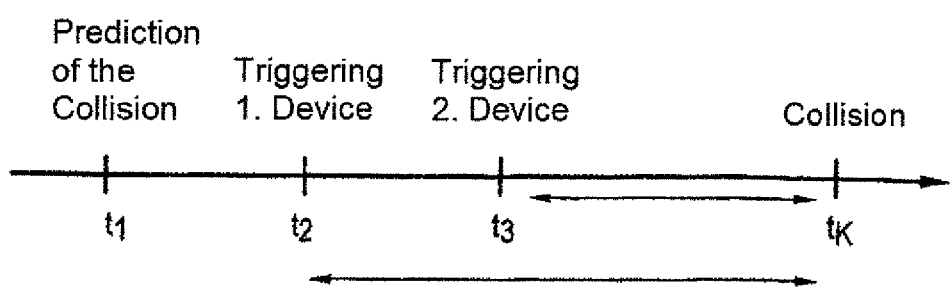
FIG. 4 a diagram illustrating the timing sequence of the essential steps of the method according to the invention for controlling a safety system.

In the following, reference is made also to FIG. 4. FIG. 4 is a diagram illustrating the timing sequence of the steps of the method for controlling the safety system. The evaluation unit 3 has predicted the occurrence of an unavoidable collision at time instance $t_k$.

The motor vehicle 1 shown in FIG. 1 includes a first device configured as belt tensioner 7 and causing a rearward displacement of the vehicle occupant 4 after being triggered. In the illustrated exemplary embodiment, the impending collision is predicted at time instance $t_1$. At time instance $t_2$, the first device, configured as belt tensioner 7, is triggered by a control device 10. In the illustrated exemplary embodiment, the first device is activated 50 ms before the time instance of the collision. This value is, however, not to be understood as a limitation; the time instance of triggering the first device may, for example, be 300 ms or 5 ms in other exemplified embodiments or modified safety systems prior to the predicted collision.

Figure 2:
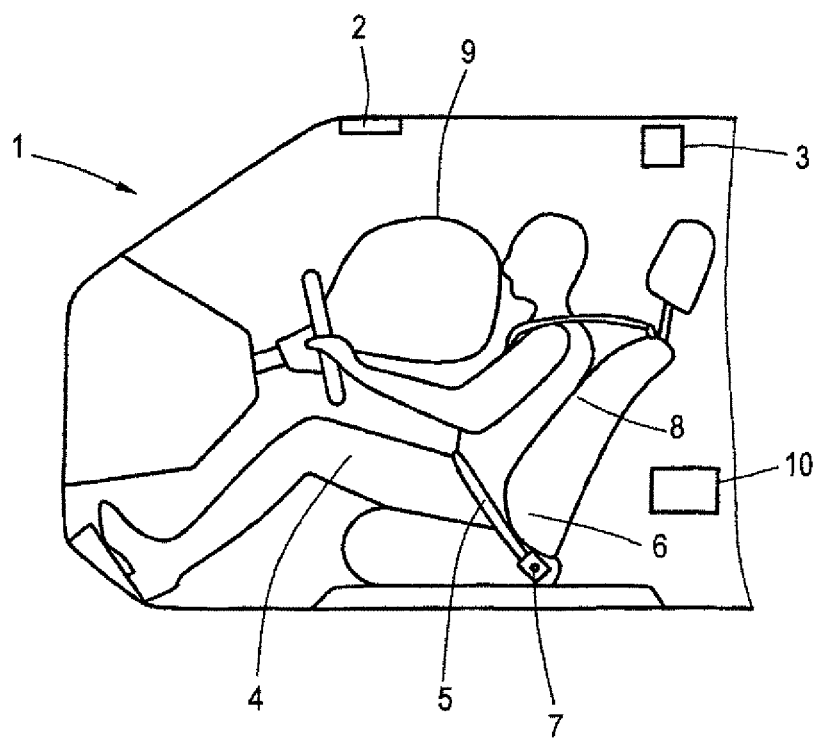
FIG. 2 the safety system shown in FIG. 1, after the first device has been triggered.
Figure 3:
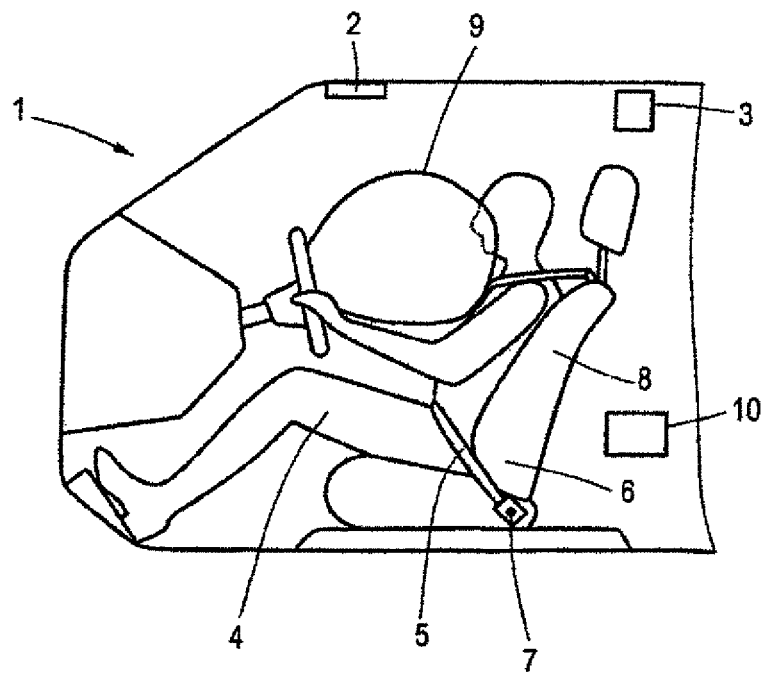
FIG. 3 the safety system shown in FIG. 1, after the second device has been triggered.

As the belt tensioner 7 is tensed, the vehicle occupant 4 is drawn tighter against the vehicle seat 6, especially against the backrest 8. As shown in FIG. 2, the upper torso of the vehicle occupant 4 is shifted rearwards in this way and moved or accelerated in opposition to the travel direction. At the same time, an airbag 9 is deployed so that the vehicle occupant 4 is subjected to a force which urges the occupant backwards in opposition to the travel direction to thereby assist the rearward shift.

At time instance $t_3$, a second device is triggered to apply a counterforce upon the vehicle occupant 4. In the illustrated exemplary embodiment, the backrest 8 is controlled such that the desired counterforce is exerted upon the vehicle occupant 4. In the illustrated exemplary embodiment, the backrest 8 is moved counterclockwise.

In the illustrated exemplary embodiment, the second device is triggered 50 ms prior to the calculated time instance of the collision $t_k$. The counterforce, generated by the adjustment of the backrest 8, is maintained at least up to the time instance of the collision so that the elasticity of the safety belt 5 of the vehicle seat 6 and the clothing of the vehicle occupant 4 is reduced. The same is true for body parts, such as e.g. thorax or pelvis, which are at risk. As the vehicle occupant 4 has shifted backwards at the time instance when the collision begins and is restrained by the applied counterforce, he participates in the deceleration of the motor vehicle 1 as of the impact, so that the risk of injuries is significantly decreased.

What is claimed is:

1. A safety system for a motor vehicle, comprising:
   an evaluation unit;
   a sensor, operably connected to the evaluation unit, for predicting an impending collision;
   a first device configured to cause a rearward displacement of at least one vehicle occupant;
   a second device configured to apply a counterforce upon the at least one vehicle occupant; and
   a control device configured to trigger operation of the first device at a predetermined first time instance prior to the predicted collision to cause the rearward displacement of the at least one vehicle occupant, said control device being configured to trigger at a predetermined second time instance that follows the first time instance prior to the predicted collision operation of the second device to apply the counterforce.

2. The safety System of claim 1, wherein at least one of the first and second devices is configured such as to maintain the counterforce up to the collision.

3. The safety System of claim 1, wherein the first device includes a belt tensioner and/or an airbag.

4. The safety System of claim 3, wherein the belt tensioner is lockable as the counterforce is generated.

5. The safety System of claim 3, wherein the airbag has no or no open discharge opening as the counterforce is generated.

6. The safety System of claim 1, wherein the second device is configured as vehicle seat or backrest.

7. The safety System of claim 1, wherein the first time instance is 300 ms to 5 ms prior to the collision.

8. The safety System of claim 1, wherein the first time instance is approximately 100 ms prior to the collision.

9. A motor vehicle, comprising a safety system including an evaluation unit, a sensor, operably connected to the evaluation unit, for predicting an impending collision, a first device configured to cause a rearward displacement of at least one vehicle occupant, a second device configured to apply a counterforce upon the at least one vehicle occupant, and a control device configured to trigger operation of the first device at a predetermined first time instance prior to the predicted collision to cause the rearward displacement of the at least one vehicle occupant, said control device being configured to trigger at a predetermined second time instance that follows the first time instance prior to the predicted collision operation of the second device to apply the counterforce.

10. The motor vehicle of claim 9, wherein at least one of the first and second devices is configured such as to maintain the counterforce up to the collision.

11. The motor vehicle of claim 9, wherein the first device includes a belt tensioner and/or an airbag.

12. The motor vehicle of claim 11, wherein the belt tensioner is lockable as the counterforce is generated.

13. The motor vehicle of claim 11, wherein the airbag has no or no open discharge opening as the counterforce is generated.

14. The motor vehicle of claim 9, wherein the second device is configured as vehicle seat or backrest.

15. The motor vehicle of claim 9, wherein the first time instance is 300 ms to 5 ms prior to the collision.

16. The motor vehicle of claim 9, wherein the first time instance is approximately 100 ms prior to the collision.

17. A method of controlling a safety system for a motor vehicle, comprising:
   predicting the presence of an impending collision;
   triggering operation of a first device at a predetermined first time instance prior to the predicted collision to cause a rearward displacement of at least one vehicle occupant; and
   triggering operation of a second device at a predetermined second time instance that follows the first time instance prior to the predicted collision to apply a counterforce upon the at least one occupant.

18. The method of claim 17, wherein at least one of the first and second devices is configured such as to maintain the counterforce up to the collision.

19. The method of claim 17, wherein the first device is a belt tensioner and/or an airbag, with the belt tensioner being locked as the counterforce is generated, or with the airbag having no or no open discharge opening as the counterforce is generated.

20. The method of claim 17, wherein the second device is a vehicle seat or a backrest.

\* \* \* \* \*